United States Patent
Jing et al.

(10) Patent No.: US 7,903,380 B2
(45) Date of Patent: Mar. 8, 2011

(54) ESD PROTECTION CIRCUIT FOR INSIDE A POWER PAD OR INPUT/OUTPUT PAD

(75) Inventors: Tao Jing, Fremont, CA (US); Maidong Dai, San Jose, CA (US)

(73) Assignee: Integrated Device Technology, inc., San Jose, CA (US)

( * ) Notice: Subject to any disclaimer, the term of this patent is extended or adjusted under 35 U.S.C. 154(b) by 316 days.

(21) Appl. No.: 12/256,643

(22) Filed: Oct. 23, 2008

(65) Prior Publication Data

US 2009/0109583 A1   Apr. 30, 2009

Related U.S. Application Data

(60) Provisional application No. 60/982,616, filed on Oct. 25, 2007.

(51) Int. Cl.
*H02H 3/22* (2006.01)
(52) U.S. Cl. ........................... 361/56; 361/111
(58) Field of Classification Search .................. 361/56, 361/111
See application file for complete search history.

(56) References Cited

U.S. PATENT DOCUMENTS

| | | | |
|---|---|---|---|
| 4,791,318 A | 12/1988 | Lewis et al. | |
| 5,508,649 A | 4/1996 | Shay | |
| 6,147,538 A | 11/2000 | Andresen et al. | |
| 7,027,275 B2 * | 4/2006 | Smith | 361/56 |
| 7,098,717 B2 * | 8/2006 | Watt | 327/313 |
| 2006/0103998 A1 * | 5/2006 | Smith | 361/91.1 |

* cited by examiner

*Primary Examiner* — Danny Nguyen
(74) *Attorney, Agent, or Firm* — Panitch, Schwarze, et al.

(57) ABSTRACT

An electrostatic discharge (ESD) protection circuit configured completely inside one of a power pad and an I/O pad of an electronic circuit, the ESD protection circuit comprising an electrostatic discharge (ESD) circuit that, when activated, discharges an ESD from a first voltage bus to a second voltage bus. The second voltage bus is at a lower electrical potential than the first voltage bus. An ESD discharge control circuit in electrical connection with the ESD discharge circuit that controls the activation of the ESD discharge circuit and including an NMOS transistor and an electrical node. The NMOS transistor regulating a rate of voltage decay of the electrical node from a predetermined high voltage level to a lower voltage level, the regulation of the rate of voltage decay of the electrical node is non-linear. The activation of the ESD discharge circuit determined by the rate of voltage decay of the electrical node.

6 Claims, 5 Drawing Sheets

ESD PROTECTION CIRCUIT FOR INSIDE A POWER PAD OR INPUT/OUTPUT PAD

CROSS-REFERENCE TO RELATED APPLICATIONS

This application claims the benefit of U.S. Patent Application No. 60/982,616, filed on Oct. 25, 2007.

BACKGROUND OF THE INVENTION

Embodiments of the present invention relate generally to a method and apparatus for the protection of an electronic circuit's power pad and input/output circuitry from electrostatic discharge (ESD).

Current designs of ESD protection circuits such as the one shown in prior art FIG. 1 offer protection from ESD using techniques that trigger the protective action based on the rapid voltage transition of a voltage bus, typically a Vdd bus. The ESD protective circuit acts to shunt the ESD biased Vdd bus to the Vss bus, or ground, when the rate of increase in voltage of the Vdd bus satisfies predetermined rate criteria. A common implementation of a rate detection circuit utilizes a resistor and capacitor (RC) combination as shown in FIG. 1, where resistor R and capacitor C act to maintain node B2 either high or low, based on the time constant of the RC combination. A high node B2 acts to gate (turn-on) the NMOS transistor B6 and shunt the Vdd bus to the Vss bus and a low node B2 acts to turn-off NMOS transistor B6. As shown in FIG. 2, a limitation of the existing RC combination scheme is that the use of the resistor R causes the voltage at node B2 to decay at a rate that effectively limits the level to which the Vdd bus voltage can be lowered.

Also, the ESD protective circuit implemented in FIG. 1 is not configured entirely inside the power pad or input/output (I/O) pads of the respective circuits but instead are comprised of circuit elements located external to the power or (I/O) pads. This requires the cooperation of circuit elements located inside the power pad or I/O pads with elements outside the respective pads thereby creating undesirable complexity and potential reliability issues.

It is desirable to provide a circuit that discharges an electrostatic biased voltage in a power pad or input/output pad to voltage levels lower than levels at which existing ESD protection circuits can discharge ESD and in a time frame that prevents circuit damage from occurring. Further, it is desirable for such an ESD protection circuit to be located entirely inside the power pad or input/output (I/O) pad and not require specially designed ESD circuitry located outside the power pad or I/O pad.

BRIEF SUMMARY OF THE INVENTION

Briefly stated, embodiments of the present invention comprise an electrostatic discharge (ESD) protection circuit configured completely inside a power pad or an I/O pad of an electronic circuit, the ESD protection circuit comprising an electrostatic discharge (ESD) circuit that, upon an activation, discharges an ESD from a first voltage bus to a second voltage bus. The second voltage bus is at a lower electrical potential than the first voltage bus. The ESD circuit also comprises an ESD discharge control circuit in electrical connection with the ESD discharge circuit, the ESD discharge control circuit controlling the activation of the ESD discharge circuit and including at least one NMOS transistor and at least one electrical node. The at least one NMOS transistor regulates a rate of voltage decay of the at least one electrical node from a predetermined high voltage level to a predetermined low voltage level, the regulation of the rate of voltage decay of the at least one electrical node being non-linear. The activation of the ESD discharge circuit is determined by the rate of voltage decay of the at least one electrical node.

BRIEF DESCRIPTION OF THE SEVERAL VIEWS OF THE DRAWINGS

The following detailed description of preferred embodiments of the present invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 3:
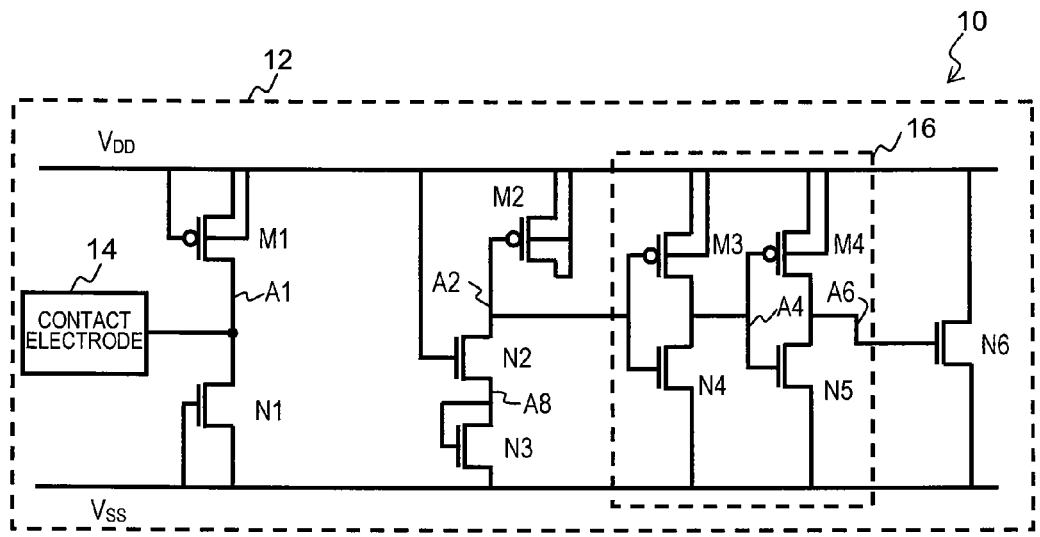
FIG. 3 is a schematic diagram of an ESD protection circuit in accordance with a preferred embodiment of the present invention.

Referring to the drawings, wherein the same reference numerals are employed for indicating like elements throughout the several figures, there is shown in FIG. 3, a schematic representation of an ESD protection circuit 10 for discharging electrostatic voltage inside a power pad 12. When positive ESD is introduced to the power pad 12 through the contact electrode 14, it will conduct to node A1 and, if the positive ESD is of sufficient potential to forward bias the transistor M1, the Vdd bus will be driven to a level at which damage can occur to the circuit (not shown) connected to the power pad 12 or to elements of the ESD protection circuit 10 such as PMOS transistor M1 and NMOS transistor N1. Typically, this circuit is the input/output circuitry associated with the power pad 12. In the described embodiments of the present invention, the power pad 12 could be substituted with an I/O pad. If negative ESD is introduced to the power pad 12 then, when it conducts to node A1, it will pass through to Vss through transistor N1, thus causing no associated circuit damage.

Figure 5:
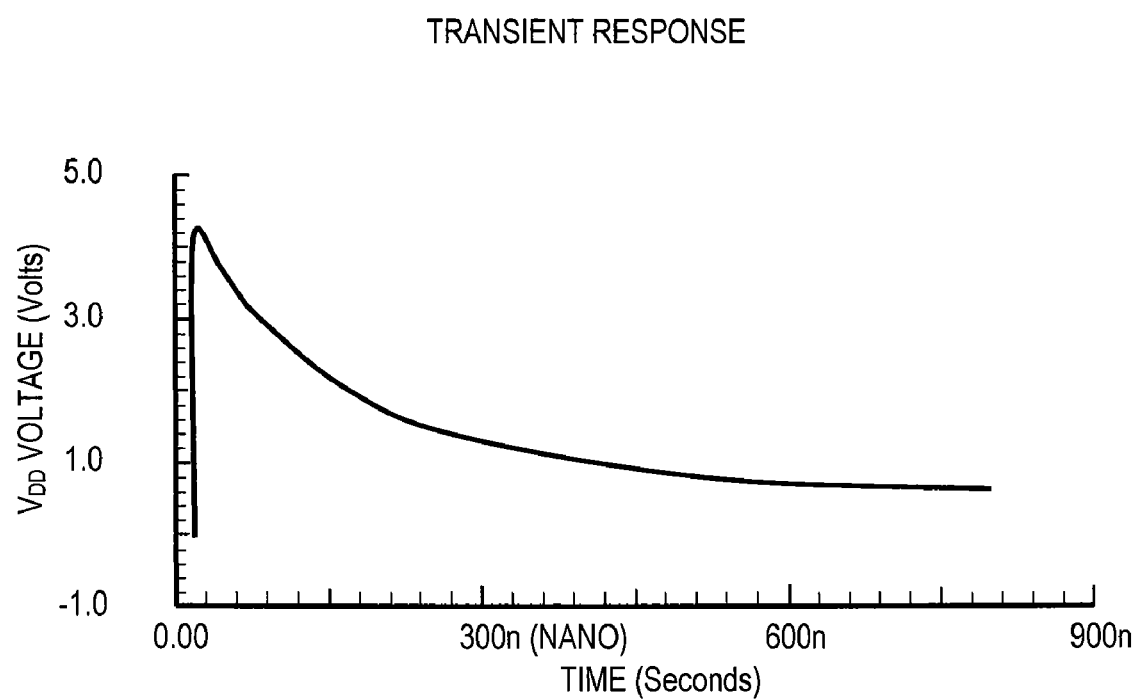
FIG. 5 is a characteristic curve showing a condition of the discharge of an ESD in accordance with a preferred embodiment of the present invention.
Figure 6:
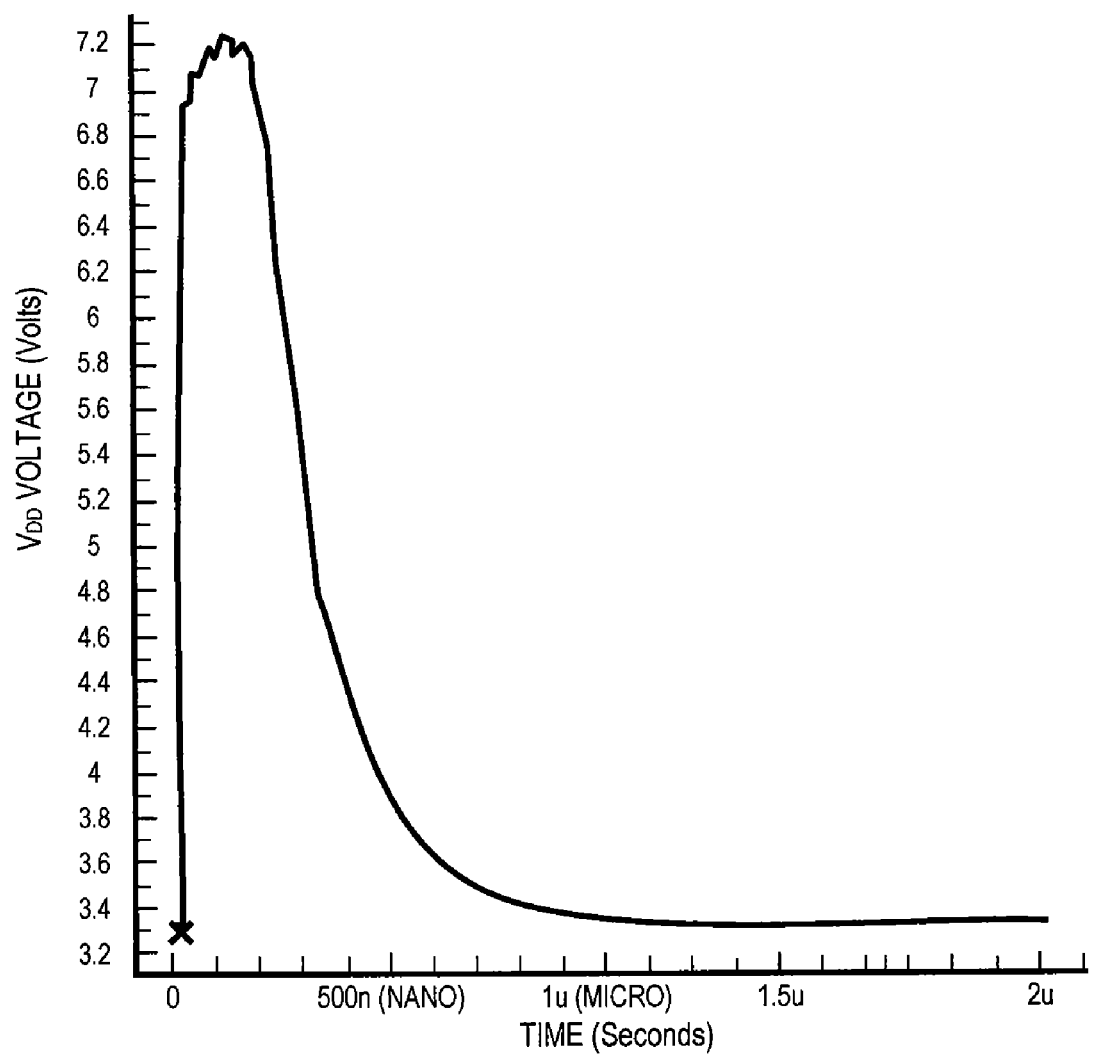
FIG. 6 is a characteristic curve showing another condition of the discharge of an ESD in accordance with a preferred embodiment of the present invention.

There are two typical Vdd bus conditions when positive ESD is introduced to the power pad 12. One condition is when the Vdd bus is at zero voltage which occurs at a time before the power pad 12 and the associated circuitry are energized or fully energized. The second condition is when the Vdd bus is at nominal voltage, such as 3.3 Volts direct current (Vdc) for example. In either condition, when an ESD is introduced to power pad 12, the Vdd bus reaches an abnormal voltage that can cause damage to the associated circuit components. The positive ESD also causes the Vdd bus to reach these abnormal voltage levels in short periods of time, typically measured in nanoseconds (ns). FIG. 5 shows the rapid increase of the Vdd bus in the condition when positive ESD is introduced to the power pad 12 when the Vdd bus is not fully energized. In FIG. 5, the Vdd bus voltage level rises from approximately zero (de-energized) to a level in excess of the nominal voltage (3.3 Vdc) in less than 20 ns. FIG. 6 shows the rapid increase of the Vdd bus in the condition when positive ESD is introduced to the power pad 12 when the Vdd bus is at a nominal voltage (3.3 Vdc). In FIG. 6, the Vdd bus voltage level rises from approximately 3.3 Vdc (nominal) to a level in excess of the nominal voltage (6-7 Vdc) in less than 100 ns. When the Vdd bus is energized from the zero state (de-energized) to the nominal voltage of 3.3 Vdc without the influence of positive ESD, the Vdd bus voltage rate of increase is much lower than seen in the curves of FIGS. 5 and 6 and is measured in microseconds (μs) or milliseconds (ms).

If the Vdd bus is at nominal voltage or de-energized, when positive ESD is introduced to the Vdd bus through transistor M1, it will raise the Vdd bus to an undesirable voltage, for example greater than 3.6 Vdc, in less than 20 ns. To discharge an ESD biased Vdd bus voltage, the ESD protection circuit 10 channels the abnormally high Vdd bus voltage to the Vss buss, which is typically connected to ground (not shown). NMOS transistor N6 is sized accordingly to discharge the Vdd bus voltage to a safe level that will cause no damage to the associated circuit if the Vdd reaches an abnormal level. As seen in FIGS. 5 and 6, NMOS transistor N6 should be sized to discharge the abnormal Vdd bus voltage in the order of 100 ns to 1000 ns.

Since positive ESD causes a rapid increase in the Vdd bus voltage, it is only desirable to discharge the Vdd bus when the Vdd bus undergoes the kind of rapid change that is associated with a positive ESD event. If the Vdd bus were discharged to the Vss bus without an antecedent rapid change in the voltage of the Vdd bus, then the ESD protection circuit 10 would be interfering with the normal operation of the Vdd bus and also the associated circuit. To gauge the change of the Vdd bus voltage, PMOS transistor M2 is configured to act as a capacitor and thus track the Vdd bus voltage. Due to the PMOS transistor M2's configuration, until the gate of the PMOS transistor M2 is sufficiently biased by the conduction to the Vss bus by the two series NMOS transistors N2 and N3, PMOS transistor M2 will serve to maintain the voltage at node A2 at a voltage near the Vdd bus voltage.

Figure 1:
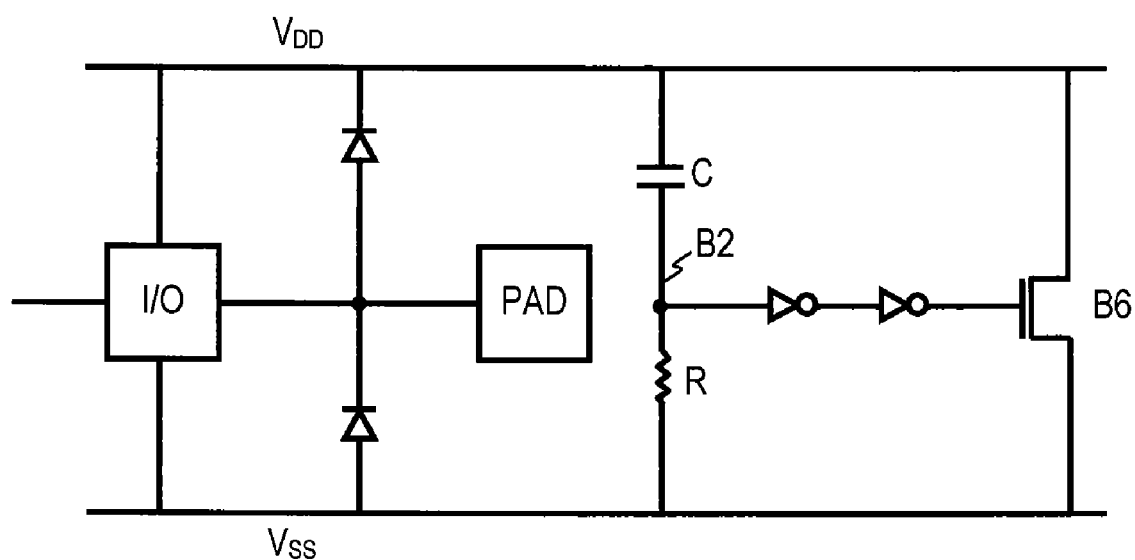
FIG. 1 is a schematic diagram of a prior art ESD protection circuit.

The NMOS transistors N2 and N3 functionally "drain" the capacitive effect of the PMOS transistor M2 by conducting the gate of the PMOS transistor M2 to the Vss bus voltage. In this way, NMOS transistors N2 and N3 function like a high resistance discharge to the Vss bus and the "resistance" changes with the level of the Vdd bus voltage due to the non-linear characteristic of the NMOS transistor N2 and N3. Given this variable resistor effect, the ESD protection circuit 10 is not as constrained in ESD discharge as is the ESD circuit shown in FIG. 1 which has a fixed resistor R and thus an RC time constant that does not vary according to the Vdd bus voltage. The NMOS transistors N2 and N3 are sized in such a way that they cannot function to discharge the PMOS transistor M2 in the rapid time period that a positive ESD can cause an abnormal Vdd bus voltage to develop. Therefore, in the event that a positive ESD has caused an abnormal Vdd bus voltage to develop, the NMOS transistors N2 and N3 cannot effectively "drain" the PMOS transistor M2 quickly enough to prevent node A2 from being maintained at a voltage close to the Vdd voltage. Given this designed capacity limitation in NMOS transistors N2 and N3 to drain the PMOS transistor M2, NMOS transistors N2 and N3 effectively also serve as a latch, time varying based on the Vdd bus voltage, maintaining the ESD biased voltage at node A2 for the period of time necessary for the Vdd bus voltage to return to a predetermined safe level. As will be discussed in more detail below, the time-delayed voltage drain of node A2 allows for an effective discharge of the ESD from the Vdd bus to the Vss bus.

The NMOS transistors N2 and N3 are sized to lower the voltage at node A2 in a time period that allows for the discharge of ESD from the Vdd bus. If the Vdd bus is operating at a nominal voltage or the Vdd bus energizes from a 0 Vdc state to the nominal voltage under normal conditions (which as described above is a time period measured in μs or ms, not ns), the NMOS transistors N2 and N3 will effectively drain the PMOS transistor M2 in a time period that prevents the node A2 from being maintained at a voltage close to the Vdd bus voltage. Those skilled in the art will recognize that the NMOS transistor N2 will not conduct to drain the PMOS transistor M2 until the Vdd bus applied to the gate of NMOS transistor N2 exceeds the predetermined threshold voltage of NMOS transistor N2. NMOS transistor N2 therefore operates differently than the fixed resistor R in FIG. 1 where current from the Vdd bus is conducted immediately by R. Therefore, with reference to the comparison seen in FIG. 2, the NMOS transistor N2 is a contributor to variable time constant and thus the more gradual decay of the voltage at node A2 as compared to node B2 in similar applied voltage circumstances.

Figure 2:
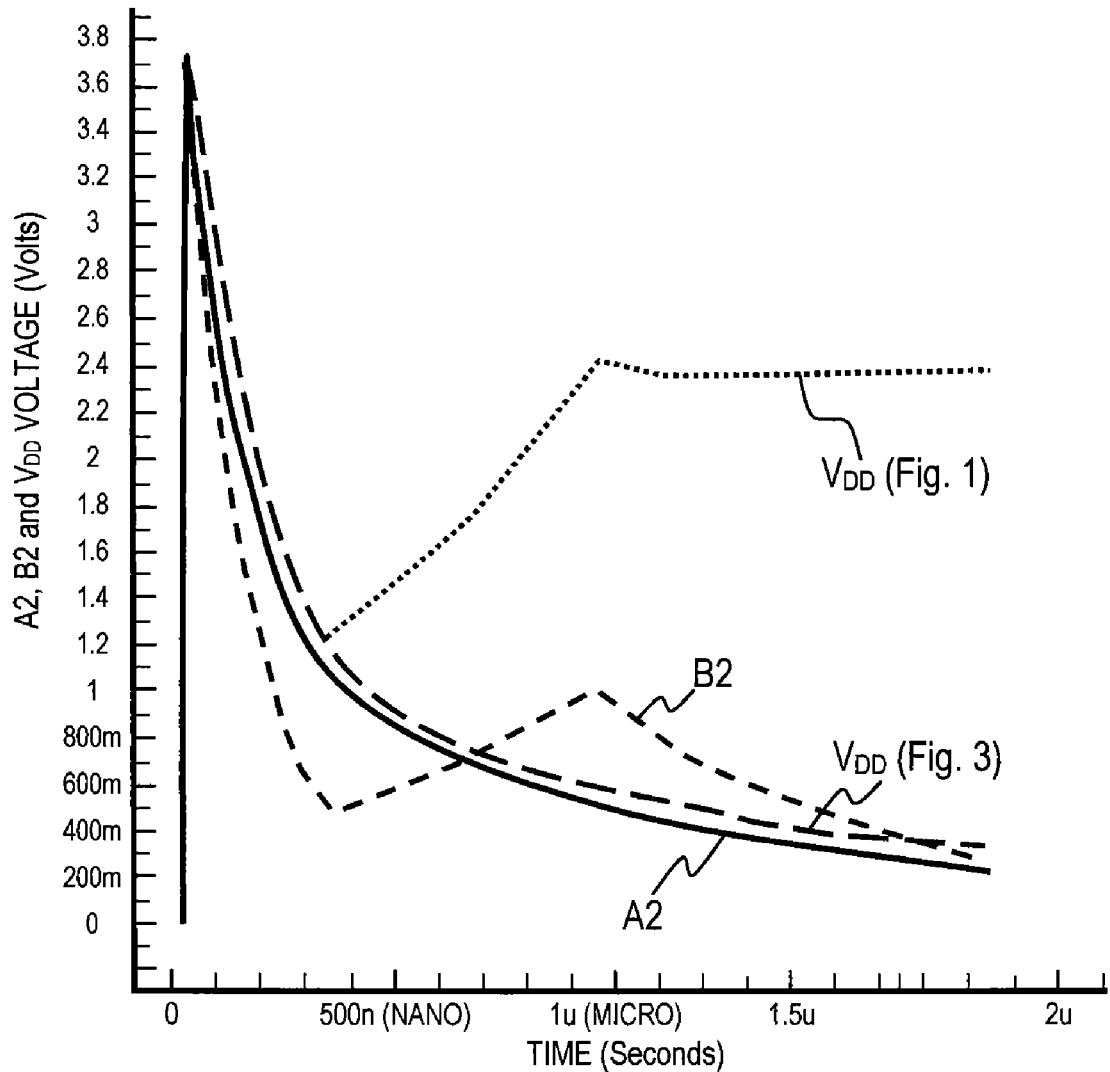
FIG. 2 is a characteristic voltage curve of the prior art ESD protection circuit and an embodiment of the present invention.

Node A8, located between NMOS transistors N2 and N3, is in electrical connection with the gate of the NMOS transistor N3 and therefore the voltage at node A8 must be sufficient to gate NMOS transistor N3 to conduct nodes A2 and A8 to the Vss bus. The threshold voltage of the NMOS transistor N3 is selected to satisfy the criteria that the voltage decay of the node A2 is gradual enough such that the NMOS transistor N6 can drain the Vdd bus to a predetermined level. As seen in FIG. 2, the graduation of the decay in the voltage of the node A2 is less steep than the voltage of the corresponding node B2 in the prior art. The graduation of the voltage decay of the node A2 results in a Vdd bus voltage which, as seen in FIG. 2, is lower than the Vdd bus voltage in the FIG. 1 where the Vdd bus voltage is the result of the steeper decay graduation of the node B2. Also, as seen in FIG. 2, since the Vdd bus voltage in FIG. 3 is drained to a lower level than the Vdd bus in FIG. 1, the Vdd bus voltage of FIG. 3 is not susceptible to the short-time voltage increase that occurs in the Vdd bus in FIG. 1. Collectively, PMOS transistor M2, node A2, node A8, NMOS transistors N2 and N3, and the Vdd bus input to the gate of NMOS transistor can be referred to as an ESD discharge control circuit that controls the activation of an ESD discharge circuit which is discussed below.

The ESD protection circuit 10 activates the NMOS transistor N6 to channel abnormal Vdd buss voltage to the Vss buss by way of the buffer 16. As seen in the embodiment shown in FIG. 3, the buffer is comprised of two CMOS devices connected in series. The first stage CMOS device includes PMOS transistor M3 and NMOS transistor N4. Node A2 serves as the input to the first stage CMOS device of the buffer 16. The second stage CMOS device includes PMOS transistor M4 and NMOS transistor N5. The first stage CMOS outputs to node A4 which in turn serves as the input to the second stage CMOS that outputs to node A6, thereby providing the gate input to NMOS transistor N6. When NMOS transistor N6 is gated, the abnormal Vdd bus voltage is discharged to the Vss bus. Typically, the second stage CMOS device is larger than the first stage CMOS device that drives the second stage CMOS device. Also, NMOS transistor N6 is typically larger than the second stage CMOS device. Although the preferred embodiment of the buffer 16 utilizes two CMOS devices, more than two CMOS devices could be included in the buffer 16 as desired to implement additional stages, perhaps to drive larger additional CMOS device stages so that an even larger NMOS transistor N6 may in turn be operated. In an alternative embodiment, a PMOS transistor can be used in place of NMOS transistor N6. Typically, if a PMOS transistor is used in place of the NMOS N6, the PMOS transistor must be larger than the NMOS transistor due to conductivity differences. Collectively, the first stage and second stage CMOS devices, node A4, node A6 (the buffer 16), and the NMOS transistor N6 can be referred to as an ESD discharge circuit that, upon activation from node A2 (of the ESD discharge control circuit), discharges ESD from a voltage bus or node to a point at lower electrical potential (voltage) than the voltage bus or node.

Figure 4:
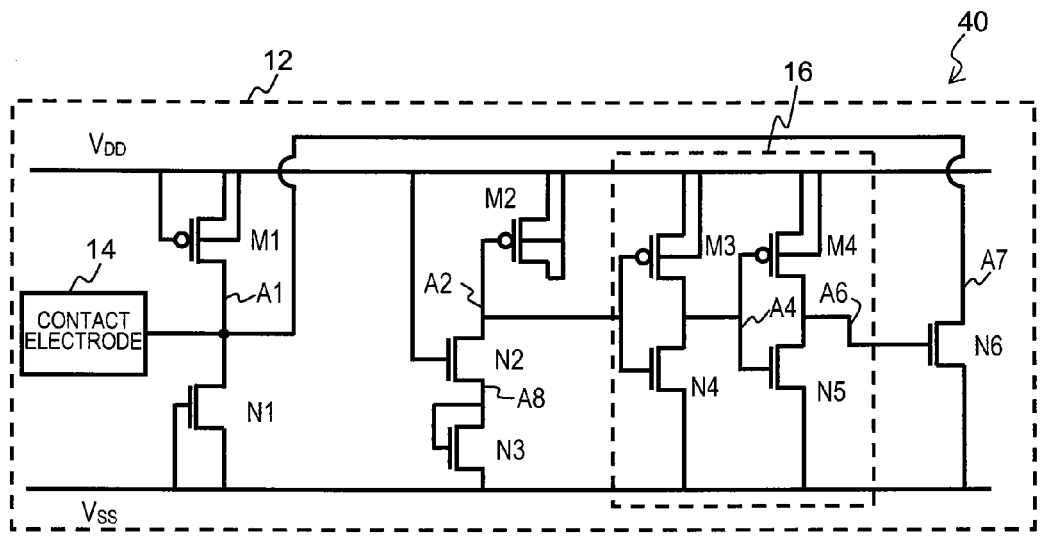
FIG. 4 is a schematic of an ESD protection circuit in accordance with another preferred embodiment of the present invention.

An alternative preferred embodiment of the ESD protection circuit is shown FIG. 4. In FIG. 4, ESD protection circuit 40 is configured in a similar way to the ESD protection circuit 10. A difference between the ESD protection circuit 10 and the ESD protection circuit 40 is that the electrical connection between the contact electrode 14 and the source/drain of the NMOS transistor N6 at node A7 does not include the PMOS transistor M1. This embodiment allows for a more efficient discharge path for the ESD since the ESD does not need to be conducted through the PMOS transistor M1. This efficiency is manifested in a smaller sized PMOS transistor M1 and a shorter time period required to discharge an ESD from the contact electrode 14. This embodiment also allows for the maintenance of the Vdd at a lower voltage level during an ESD event. All other aspects of the ESD protection circuit 40 function as described regarding the ESD protection circuit 10.

In a typical operation of the preferred embodiment shown in FIG. 3, if a positive ESD is introduced to the contact electrode 14 of the power pad 12 (or an I/O pad), the ESD will pass to node A1 where the PMOS transistor M1 will conduct the ESD voltage to the Vdd bus. The ESD will cause the Vdd bus voltage to increase rapidly, such as within 20 ns. The PMOS transistor M2, acting like a capacitor, will track the Vdd bus voltage and will act to raise the node A2 to a voltage close to the Vdd bus voltage. Given the rapid rise in Vdd bus voltage due to the ESD, the NMOS transistors N2 and N3 cannot drain the PMOS transistor M2 in a time period that will prevent the node A2 from rising toward voltage level of the Vdd bus voltage. A "high" voltage at node A2 will input to the first stage CMOS of buffer 16 causing NMOS transistor N4 to output a voltage close to the Vss bus voltage at node A4. This "low" voltage at node A4 serves as the input to the second stage CMOS device of buffer 16 causing PMOS transistor M4 to output a voltage close to the Vdd bus voltage at node A6. This "high" voltage at node A6 serves as the gate voltage to the NMOS transistor N6, causing the NMOS transistor N6 to conduct the Vdd bus to the Vss bus, thereby discharging the ESD from the Vdd bus.

Once the NMOS transistors N2 and N3 have effectively drained the PMOS transistor M2 and thus lowered the voltage of node A2 to a "low" level, the input to the first stage CMOS of the buffer 16 will consequently change to a "low" value. The change in the input to the first stage CMOS of the buffer 16 will consequently change the output of the second stage CMOS of buffer 16 thus causing NMOS transistor N6 to cease conducting the Vdd bus to the Vss bus. The length of time required for NMOS transistors N2 and N3 to discharge the node A2 and thus stop the NMOS transistor N6 from conducting the Vdd bus to the Vss bus is sufficient to allow for the Vdd bus to be discharged of the ESD. As discussed above, the threshold voltage of the NMOS transistor N3 is selected in order to slow the decay of the voltage at node A2. A slower voltage decay at node A2 allows the NMOS transistor N6 to conduct the Vdd bus voltage to a lower level than if the NMOS transistors N2 and N3 were not present or were instead a resistor (or resistors) as used in the prior art.

The preferred embodiments of the present invention are configured to be implemented inside the power pad 12 (or I/O pad) as seen in the FIGS. 3 and 4. Accordingly, an ESD event can be discharged without the assistance or cooperation of circuitry located outside of the power pad 12 (or I/O pad). Thus, the embodiments of the present invention do not require connectivity with any specialized ESD circuitry located outside the power pad 12 (or I/O pad). However, embodiments of the present invention can also be configured to be partially implemented inside the power pad 12 (or I/O pad). Accordingly, elements of the ESD protection circuits 10 and 40 can be located outside the power pad 12 (or I/O pad) and the elements external to the power pad 12 (or I/O pad) can be configured to act in cooperation with the elements inside the power pad 12 (or I/O pad).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An electrostatic discharge (ESD) protection circuit configured completely inside one of a power pad and an input/output pad of an electronic circuit, the ESD protection circuit comprising:

an electrostatic discharge (ESD) circuit that, upon an activation, discharges an ESD from a first voltage bus to a second voltage bus, the second voltage bus being at a lower electrical potential than the first voltage bus; and an ESD discharge control circuit in electrical connection with the ESD discharge circuit, the ESD discharge control circuit controlling the activation of the ESD discharge circuit and including at least one NMOS transistor and at least one electrical node, the at least one NMOS transistor regulating a rate of voltage decay of the at least one electrical node from a predetermined high voltage level to a predetermined low voltage level, the regulation of the rate of voltage decay of the at least one electrical node being non-linear, and the activation of the ESD discharge circuit being determined by the rate of voltage decay of the at least one electrical node.

2. The ESD discharge protection circuit of claim 1, the ESD discharge control circuit further comprising:

a second at least one NMOS transistor, the second at least one NMOS having only one of a source and a drain in electrical connection with only one of a source and drain of the first at least one transistor at a second at least one electrical node;

the second at least one NMOS transistor having a gate, the gate of the second at least one NMOS transistor being in electrical connection with the second at least one electrical node; and a PMOS transistor, the PMOS transistor having a source, a drain and a gate, both the source and the drain of the PMOS transistor in electrical connection with the first voltage bus, wherein only one of the source and the drain of the first at least one NMOS transistor being in electrical connection with the gate of the PMOS transistor at the at least one electrical node, wherein the first at least one NMOS transistor having a gate, the gate of the at least one electrical node being in electrical connection with the first voltage bus, and wherein only one of the source and the drain of the second at least one NMOS transistor being in electrical connection with the second voltage bus.

3. An electrostatic discharge (ESD) protection circuit configured completely inside one of a power pad and an input/output pad of an electronic circuit, the ESD protection circuit comprising:

an electrostatic discharge (ESD) circuit that, upon an activation, discharges an ESD from a contact electrode of one of a power pad and an input/output pad to a first voltage bus, the first voltage bus being at a lower electrical potential than the contact electrode; and an ESD discharge control circuit in electrical connection with the ESD discharge circuit, the ESD discharge control circuit controlling the activation of the ESD discharge circuit and including at least one NMOS transistor and at least one electrical node, the at least one NMOS transistor regulating a rate of voltage decay of the at least one electrical node from a predetermined high voltage level to a predetermined low voltage level, the regulation of the rate of voltage decay of the at least one electrical node being non-linear, and the activation of the ESD discharge circuit being determined by the rate of voltage decay of the at least one electrical node.

4. The ESD discharge protection circuit of claim 3, the ESD discharge control circuit further comprising:

a second at least one NMOS transistor, the second at least one NMOS having one of a source and a drain in electrical connection with one of a source and drain of the first at least one transistor at a second at least one electrical node;

the second at least one NMOS transistor having a gate, the gate of the second at least one NMOS transistor being in electrical connection with the second at least one electrical node; and a PMOS transistor, the PMOS transistor having a source, a drain and a gate, both the source and the drain of the PMOS transistor in electrical connection with the first voltage bus, wherein one of the source and the drain of the first at least one NMOS transistor being in electrical connection with the gate of the PMOS transistor at the at least one electrical node, wherein the first at least one NMOS transistor having a gate, the gate of the at least one electrical node being in electrical connection with the first voltage bus, and wherein only one of the source and the drain of the second at least one NMOS transistor being in electrical connection with the second voltage bus.

5. An electrostatic discharge (ESD) protection circuit configured partially inside one of a power pad and an input/output pad of an electronic circuit, the ESD protection circuit comprising:

an electrostatic discharge (ESD) circuit that, upon an activation, discharges an ESD from a first voltage bus to a second voltage bus, the second voltage bus being at a lower electrical potential than the first voltage bus; and an ESD discharge control circuit in electrical connection with the ESD discharge circuit, the ESD discharge control circuit controlling the activation of the ESD discharge circuit and including at least one NMOS transistor and at least one electrical node, the at least one NMOS transistor regulating a rate of voltage decay of the at least one electrical node from a predetermined high voltage level to a predetermined low voltage level, the regulation of the rate of voltage decay of the at least one electrical node being non-linear, and the activation of the ESD discharge circuit being determined by the rate of voltage decay of the at least one electrical node.

6. An electrostatic discharge (ESD) protection circuit configured partially inside one of a power pad and an input/output pad of an electronic circuit, the ESD protection circuit comprising:

an electrostatic discharge (ESD) circuit that, upon an activation, discharges an ESD from a contact electrode of one of a power pad and an input/output pad to a first voltage bus, the first voltage bus being at a lower electrical potential than the contact electrode; and an ESD discharge control circuit in electrical connection with the ESD discharge circuit, the ESD discharge control circuit controlling the activation of the ESD discharge circuit and including at least one NMOS transistor and at least one electrical node, the at least one NMOS transistor regulating a rate of voltage decay of the at least one electrical node from a predetermined high voltage level to a predetermined low voltage level, the regulation of the rate of voltage decay of the at least one electrical node being non-linear, and the activation of the ESD discharge circuit being determined by the rate of voltage decay of the at least one electrical node.

* * * * *